(12) United States Patent
Mitadera et al.

(10) Patent No.: US 8,778,470 B2
(45) Date of Patent: Jul. 15, 2014

(54) MULTI-LAYER BOTTLE

(75) Inventors: Jun Mitadera, Kanagawa (JP); Katsuya Maruyama, Kanagawa (JP); Kazunobu Maruo, Kanagawa (JP); Tomonori Kato, Kanagawa (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 1286 days.

(21) Appl. No.: 12/160,469

(22) PCT Filed: Jan. 15, 2007

(86) PCT No.: PCT/JP2007/050420
§ 371 (c)(1),
(2), (4) Date: Jul. 10, 2008

(87) PCT Pub. No.: WO2007/083598
PCT Pub. Date: Jul. 26, 2007

(65) Prior Publication Data
US 2010/0233401 A1    Sep. 16, 2010

(30) Foreign Application Priority Data
Jan. 18, 2006 (JP) ................................. 010040/2006

(51) Int. Cl.
*B32B 1/02* (2006.01)
*C08F 283/04* (2006.01)

(52) U.S. Cl.
USPC ......................................... 428/35.7; 525/420

(58) Field of Classification Search
USPC .................. 428/36.6, 35.7; 525/420
See application file for complete search history.

(56) References Cited

U.S. PATENT DOCUMENTS 5,110,855 A * 5/1992 Blatz ............................. 524/441
6,841,211 B1 * 1/2005 Knoll et al. ................... 428/34.5
6,858,313 B2 * 2/2005 Musco et al. ............... 428/474.4
2004/0224112 A1 * 11/2004 Maruyama et al. .......... 428/35.7
2005/0009976 A1 * 1/2005 Akkapeddi et al. ........... 524/445

FOREIGN PATENT DOCUMENTS

| EP | 1475308 A1 * | 11/2004 |
| JP | 2004-160935 | 6/2004 |
| JP | 2004-181628 | 7/2004 |
| JP | 2004-181629 | 7/2004 |
| JP | 2004-351668 | 12/2004 |
| JP | 2004-351927 | 12/2004 |
| JP | 2004-352361 | 12/2004 |
| JP | 2007-210209 | 8/2007 |

OTHER PUBLICATIONS

Extended European Search Report, including Supplementary European Search Report and Search Opinion, dated Nov. 18, 2009, for Application No. EP 07 70 6754.

* cited by examiner

*Primary Examiner* — Erik Kashnikow
(74) *Attorney, Agent, or Firm* — Antonelli, Terry, Stout & Kraus, LLP.

(57) ABSTRACT

There is provided a multilayer bottle including outermost and innermost layers each made mainly of a polyester (A) and at least one barrier layer interposed between the outermost and innermost layers. The polyester (A) is a thermoplastic resin obtained by polymerizing a dicarboxylic acid component containing 80 mol % or more of terephthalic acid with a diol component containing 80 mol % or more of ethylene glycol. The barrier layer is composed of a polyamide (B) and a polyamide (C). The polyamide (B) is obtained by polycondensing a diamine component containing 70 mol % or more of m-xylylenediamine with a dicarboxylic acid component containing 70 mol % or more of an α,ω-linear aliphatic dicarboxylic acid having 4 to 20 carbon atoms. The polyamide (C) has a higher saturation water content than that of the polyamide (B) as measured at 23° C. and 50% RH under 1 atm, and a content of the polyamide (C) in the barrier layer is 20% by weight or less on the basis of a weight of the barrier layer. The multilayer bottle hardly suffers from delamination upon dropping or upon exposure to impact and, therefore, is not required to have a shape with less irregularities or less bends for preventing the delamination, and further has a large freedom of design choice.

20 Claims, No Drawings

MULTI-LAYER BOTTLE

TECHNICAL FIELD

The present invention relates to techniques for preventing delamination of multilayer bottles having an excellent gas-barrier property, and more particularly to multilayer bottles that are prevented from undergoing delamination even when exposed to impact upon filling contents therein, upon transportation or upon dropping by improving an interlaminar bonding strength between an innermost or outermost layer and an intermediate layer formed therebetween, as well as that are free from delamination between these layers without forming the bottles into a shape with less irregularities and less bends, and have a large freedom of design choice.

BACKGROUND ART

At present, plastic containers (bottles, etc.) made mainly of polyesters such as polyethylene terephthalate (PET) have been extensively used as containers for teas, fruit juices, carbonated beverages, etc. Among these plastic containers, plastic bottles of a small size have increased in proportion year by year. In general, as the size of a bottle is reduced, a surface area thereof per unit volume of contents therein tends to increase. Therefore, a gustoish period of contents in the small-size bottles tends to be shortened. In recent years, beer susceptible to influences of oxygen and light as well as hot tea which are filled in a plastic bottle have been put on the market. Thus, with the recent tendency that the plastic containers are used in more extensive applications, the plastic containers have been required to be further improved in gas-barrier property against oxygen, carbon dioxide, etc.

To provide plastic bottles having a good gas-barrier property, there have been developed multilayer bottles produced from a thermoplastic polyester resin and a gas-barrier resin, blend bottles, barrier-coated bottles produced by forming a carbon coat, a deposited coat or a barrier resin coat onto a single layer bottle made of a thermoplastic polyester resin, etc.

The multilayer bottles, for example, those bottles produced by subjecting a three- or five-layer preform (parison) obtained by injecting a thermoplastic polyester resin such as PET for forming innermost and outermost layers thereof and a thermoplastic gas-barrier resin such as poly-m-xylyleneadipamide (polyamide MXD6) into a mold cavity, to biaxial stretch blow molding, have been put into practice.

Further, resins having an oxygen-capturing function which are capable of capturing oxygen within a container while preventing penetration of oxygen into the container from outside have been developed and applied to multilayer bottles. The oxygen-capturing bottles are suitably in the form of a multilayer bottle including a gas-barrier layer made of polyamide MXD6 in which a transition metal-based catalyst is blended, from the viewpoints of oxygen-absorbing rate, transparency, strength, moldability, etc.

The above multilayer bottles have been used as containers for beer, tea, carbonated beverages, etc., because of their good gas-barrier property. When the multilayer bottles are used in these applications, contents filled therein can maintain a good quality with an improved shelf life. On the other hand, the multilayer bottles tend to undergo delamination between different resin layers, for example, between the innermost or outermost layer and the intermediate layer, resulting in significant damage to their commercial value.

To solve the above problems, there is disclosed the method of blending polyamide MXD6 with nylon 6 and nylon 6I/6T to prevent crystallization of a barrier layer in a multilayer bottle, reduce a crystallization rate of the polyamide or transform the polyamide into uncrystallizable polyamide, thereby improving a delamination resistance of the bottle (refer to Patent Document 1). However, in this method, in order to prevent crystallization of the polyamide MXD6 and reduce a crystallization rate thereof, a considerable amount of nylon 6 and nylon 6I/6T having a relatively poor gas barrier property as compared to the polyamide MXD6 must be added thereto. Therefore, the resultant multilayer bottle exhibits a poorer gas barrier property than those using the polyamide MXD6 only and, therefore, fails to improve a shelf life of contents therein to a sufficient extent. In addition, when mixing a transition metal-based catalyst in the polyamide for compensating the poor oxygen-barrier property, there arises such a problem that addition of the catalyst causes increase in costs. Also, even when adding the transition metal-based catalyst, the resultant bottle is not improved in carbon dioxide-barrier property and, therefore, still unsuitable as a container for beer, carbonated beverages, etc. In the method described in the Patent Document 1, these polyamides must be melt-blended with each other using an extruder prior to molding of the bottle, resulting in increased production costs.

Patent Document 1: USP 2005/0009976A

DISCLOSURE OF THE INVENTION

An object of the present invention is to solve the above conventional problems, and provide a multilayer bottle having an excellent gas barrier property which is free from occurrence of delamination upon dropping or upon exposure to impact, need not be formed into specific shapes with less irregularities or less bends for inhibiting the delamination, and has a large freedom of design choice, with low costs.

As the result of extensive and intensive researches concerning delamination resistance of multilayer bottles, the present inventors have found that when forming a barrier layer having a specific composition, the barrier layer exhibits a good softness, and the resultant multilayer bottle is improved in interlaminar bonding strength and prevented from suffering from delamination upon dropping, etc. The present invention has been accomplished on the basis of the above finding.

Thus, the present invention relates to a multilayer bottle including outermost and innermost layers each made mainly of a polyester (A) and at least one barrier layer interposed between the outermost and innermost layers, wherein (I) the polyester (A) is a thermoplastic resin obtained by polymerizing a dicarboxylic acid component containing 80 mol % or more of terephthalic acid with a diol component containing 80 mol % or more of ethylene glycol; and (II) the barrier layer includes a polyamide (B) obtained by polycondensing a diamine component containing 70 mol % or more of m-xylylenediamine with a dicarboxylic acid component containing 70 mol % or more of an α,ω-linear aliphatic dicarboxylic acid having 4 to 20 carbon atoms, and a polyamide (C) having a higher saturation water content than that of the polyamide (B) as measured at 23° C. and 50% RH under 1 atm, a content of the polyamide (C) in the barrier layer being 20% by weight or less on the basis of a weight of the barrier layer.

BEST MODE FOR CARRYING OUT THE INVENTION

The thermoplastic polyester resin used for forming an outermost layer, an innermost layer and optionally an intermediate layer of the multilayer bottle according to the present invention is a polyester resin (hereinafter referred to merely as a "polyester (A)") which is obtained by polymerizing a dicarboxylic acid component containing terephthalic acid in an amount of 80 mol % or more and preferably 90 mol % or more (inclusive of 100 mol %) with a diol component containing ethylene glycol in an amount of 80 mol % or more and preferably 90 mol % or more (inclusive of 100 mol %).

The polyester (A) used in the present invention is preferably polyethylene terephthalate because the polyethylene terephthalate is excellent in all of transparency, mechanical strength, injection moldability and stretch blow moldability.

Examples of dicarboxylic acids other than terephthalic acid which may be contained in the dicarboxylic acid component include isophthalic acid, diphenyl ether-4,4-dicarboxylic acid, naphthalene-1,4-dicarboxylic acid, naphthalene-2,6-dicarboxylic acid, adipic acid, sebacic acid, decane-1,10-dicarboxylic acid and hexahydroterephthalic acid. Examples of diols other than ethylene glycol which may be contained in the diol component include propylene glycol, 1,4-butanediol, neopentyl glycol, diethylene glycol, cyclohexane dimethanol, 2,2-bis(4-hydroxyphenyl)propane and 2,2-bis(4-hydroxyethoxyphenyl)propane. Further, oxy acids such as p-oxybenzoic acid may also be used as a raw monomer of the polyester (A).

The polyester (A) preferably has an intrinsic viscosity of from 0.55 to 1.30 dL/g and more preferably from 0.65 to 1.20 dL/g. When the polyester (A) has an intrinsic viscosity of 0.55 dL/g or more, it is possible to produce not only a transparent amorphous multilayer preform but also a multilayer bottle having a satisfactory mechanical strength. Also, the polyester (A) having an intrinsic viscosity of 1.30 dL/g or less is free from deterioration in fluidity upon molding, resulting in facilitated production of a multilayer bottle.

Further, the polyester (A) from which the outermost or innermost layer of the multilayer bottle is mainly formed may also be blended with other thermoplastic resins or various additives unless the addition thereof adversely affects the aimed effects of the present invention. The outermost or innermost layer preferably contains the polyester (A) in an amount of 90% by weight or more (inclusive of 100% by weight). Examples of the other thermoplastic resins include thermoplastic polyester resins such as polyethylene-2,6-naphthalenedicarboxylate, polyolefin-based resins, polycarbonates, polyacrylonitrile, polyvinyl chloride and polystyrene. Examples of the additives include ultraviolet absorbers, oxygen absorbers, colorants, and infrared absorbers (reheating additives) for accelerating heating of the preform and shortening a cycle time upon molding.

The oxygen transmission rate (OTR) of the barrier layer formed in the multilayer bottle of the present invention as measured at a temperature of 23° C. and a relative humidity (RH) of 60% is preferably 0.15 cc·mm/(m$^2$·day·atm) or less, more preferably 0.12 cc·mm/(m$^2$·day·atm) or less, still more preferably 0.10 cc·mm/(m$^2$·day·atm) or less and further still more preferably 0.08 cc·mm/(m$^2$·day·atm) or less on the average. Since the barrier layer used in the present invention has such an oxygen barrier property, the obtained multilayer bottle exhibits a good gas-barrier property and is capable of prolonging a consumable date of contents to be preserved therein.

The barrier layer formed in the multilayer bottle of the present invention contains at least a polyamide (B) and a polyamide (C). The polyamide (B) is obtained by polycondensing a diamine component containing 70 mol % or more (inclusive of 100 mol %) of m-xylylenediamine with a dicarboxylic acid component containing 70 mol % or more (inclusive of 100 mol %) of an α,ω-linear aliphatic dicarboxylic acid having 4 to 20 carbon atoms. The polyamide (C) has a higher saturation water content than that of the polyamide (B) as measured at 23° C. and 50% RH under 1 atm.

In general, polyamides exhibit a water absorption property. The saturation water content of the polyamides varies depending upon kinds of the polyamides. In addition, the polyamides undergo change in various properties, for example, increase in softness, upon absorbing water therein. Thus, the polyamide (B) also becomes soft when water is absorbed therein. When the polyamide (B) used for forming the barrier layer of the multilayer bottle has a high water absorption, the resultant multilayer bottle will exhibit a good delamination resistance. However, since the polyamide (B) has a low saturation water content and a low water absorption rate as compared to those of other polyamides, the barrier layer obtained therefrom in the multilayer bottle tends to exhibit an insufficient water absorption and, therefore, a poor delamination resistance.

On the other hand, when using polyamide MXD6 having a high water absorption as the polyamide (B) upon molding of the multilayer bottle to enhance a water absorption of the polyamide (B) in the bottle, water absorbed therein tends to be foamed by heat applied during the molding process, resulting in poor commercial value of the resultant multilayer bottle. For this reason, the polyamide (B) is usually dried until the water content therein is reduced to about several hundred ppm or less to prevent foaming of the polyamide upon molding.

Thus, it has been found that when blending the polyamide (B) with the polyamide (C) having a higher saturation water content than that of the polyamide (B), the resultant barrier layer is enhanced in water absorption after molding of a multilayer bottle, and improved in softness and interlaminar bonding strength, thereby allowing the multilayer bottle to exhibit a good delamination resistance.

In the present invention, the saturation water contents of the polyamide (B) and the polyamide (C) are measured at 23° C. and 50% RH under 1 atm by the following method.

(1) A single-layer film made of the polyamide (B) or the polyamide (C) is biaxially stretched from 8 to 13 times in area ratio (without heat setting).

(2) The resultant stretched film is preserved at 23° C. and 50% RH under 1 atm over 4 weeks.

(3) The water content in the stretched film after the preservation is measured by a Carl-Fischer method at 235° C. for 30 min, and the thus measured value is determined as a saturation water content of the polyamide.

The saturation water content of the polyamide (B) as measured at 23° C. and 50% RH under 1 atm is preferably from 2.5 to 5% by weight and more preferably from 3 to 4% by weight, whereas the saturation water content of the polyamide (C) as measured at 23° C. and 50% RH under 1 atm is preferably from 3 to 13% by weight and more preferably from 3.5 to 11% by weight. When the saturation water content of the polyamide (C) is higher than that of the polyamide (B) and lies within the above-specified range, water is supplied from the polyamide (C) to the polyamide (B), so that the polyamide (B) becomes soft. As a result, when impact is applied to the bottle, the barrier layer has a good followability to the outermost and innermost layers, resulting in excellent delamination resistance of the multilayer bottle.

The polyamide (B) used in the present invention has a high barrier property and exhibits excellent properties including co-injection moldability and co-stretch blow moldability when molded together with the polyester (A) (preferably polyethylene terephthalate).

The diamine component used for production of the polyamide (B) contains m-xylylenediamine in an amount of 70 mol % or more, preferably 75 mol % or more, and more preferably 80 mol % or more (inclusive of 100 mol %). When the content of m-xylylenediamine in the diamine component is less than 70 mol %, the obtained polyamide (B) tends to be deteriorated in gas-barrier property. Examples of diamines other than m-xylylenediamine which may be used in the diamine component include, but are not limited to, aliphatic diamines such as tetramethylenediamine, pentamethylenediamine, 2-methyl pentanediamine, hexamethylenediamine, heptamethylenediamine, octamethylenediamine, nonamethylenediamine, decamethylenediamine, dodecamethylenediamine, 2,2,4-trimethylhexamethylenediamine and 2,4,4-trimethylhexamethylenediamine; alicyclic diamines such as 1,3-bis(aminomethyl)cyclohexane, 1,4-bis(aminomethyl)cyclohexane, 1,3-diaminocyclohexane, 1,4-diaminocyclohexane, bis(4-aminocyclohexyl)methane, 2,2-bis(4-aminocyclohexyl)propane, bis(aminomethyl)decalin and bis(aminomethyl)tricyclodecane; and aromatic ring-containing diamines such as bis(4-aminophenyl)ether, p-phenylenediamine, p-xylylenediamine and bis(aminomethyl)naphthalene.

The dicarboxylic acid component used for production of the polyamide (B) contains an α,ω-linear aliphatic dicarboxylic acid having 4 to 20 carbon atoms in an amount of 70 mol % or more, preferably 75 mol % or more, and more preferably 80 mol % or more (inclusive of 100 mol %). When the content of α,ω-linear aliphatic dicarboxylic acid in the dicarboxylic acid component lies within the above-specified range, the resultant polyamide (B) exhibits excellent gas-barrier property and moldability. Examples of the α,ω-linear aliphatic dicarboxylic acid having 4 to 20 carbon atoms which may be used in the present invention include aliphatic dicarboxylic acids such as succinic acid, glutaric acid, pimelic acid, suberic acid, azelaic acid, adipic acid, sebacic acid, undecanedioic acid and dodecanedioic acid. Among these α,ω-linear aliphatic dicarboxylic acids, preferred is adipic acid.

In the present invention, an aromatic dicarboxylic acid such as terephthalic acid, isophthalic acid and 2,6-naphthalenedicarboxylic acid may also be added as the dicarboxylic acid other than the α,ω-linear aliphatic dicarboxylic acid. The amount of the aromatic dicarboxylic acid, if added, is preferably from 0.5 to 30 mol % on the basis of the dicarboxylic acid component. Further, a small amount of a molecular weight controller such as monoamines and monocarboxylic acids may also be added upon the polycondensation for production of the polyamide. The dicarboxylic acid component used in the present invention preferably contains from 100 to 70 mol % of the α,ω-linear aliphatic dicarboxylic acid having 4 to 20 carbon atoms, and not less than 0 but less than 30 mol % of the other aromatic dicarboxylic acids.

The polyamide (B) may be produced by a melt-polycondensation method. For example, the polyamide (B) may be produced by the method of heating a nylon salt obtained from m-xylylenediamine and adipic acid under pressure in the presence of water, and polymerizing the salt kept in a molten state while removing water added and condensed water as produced, therefrom. Alternatively, the polyamide (B) may also be produced by the method of directly adding m-xylylenediamine to adipic acid kept in a molten state to subject these compounds to polycondensation under normal pressures. In the latter polycondensation method, in order to keep the reaction system in a uniform liquid state, m-xylylenediamine is continuously added to adipic acid, and the polycondensation reaction therebetween proceeds while heating the reaction system to a temperature not less than the melting points of oligoamide and polyamide produced.

The polyamide (B) obtained by the melt-polycondensation method may be further subjected to solid-state polymerization. The method for producing the polyamide (B) is not particularly limited to the above method, and the polyamide (B) may be produced by using the conventionally known methods and polymerization conditions.

The number-average molecular weight of the polyamide (B) is preferably from 18000 to 43500 and more preferably from 20000 to 30000. When the number-average molecular weight of the polyamide (B) lies within the above specified range, a moldability of the resin material upon forming a multilayer bottle is enhanced, and the resultant multilayer bottle exhibits an excellent delamination resistance. Meanwhile, the polyamide (B) having a number-average molecular weight of from 18000 to 43500 exhibits a relative viscosity of about 2.3 to about 4.2, and the polyamide (B) having a number-average molecular weight of from 20000 to 30000 exhibits a relative viscosity of about 2.44 to about 3.19. The relative viscosity used herein means the value obtained by measuring a viscosity of a solution prepared by dissolving 1 g of the polyamide in 100 ml of a 96% sulfuric acid, at 25° C. by using a Cannon-Fenske viscometer, etc.

The polyamide (C) used in the present invention is preferably made of an aliphatic polyamide and/or an amorphous semi-aromatic polyamide because of a high saturation water content of these polyamides. As described above, it is important that the saturation water contents of the aliphatic polyamide and the amorphous semi-aromatic polyamide used as the polyamide (C) in the present invention are respectively higher than that of the polyamide (B).

Examples of the aliphatic polyamide (polyamide (C1)) include homopolymers such as poly(6-aminohexanoic acid) (PA-6) also known as poly(caprolactam), poly(hexamethyleneadipamide) (PA-6,6), poly(7-aminoheptanoic acid) (PA-7), poly(10-aminodecanoic acid) (PA-10), poly(11-aminoundecanoic acid) (PA-11), poly(hexamethylenesebacamide) (PA-6,10), poly(hexamethyleneazelamide) (PA-6,9) and poly(tetramethyleneadipamide) (PA-4,6); and copolymers such as caprolactam/hexamethyleneadipamide copolymer (PA-6, 6/6) and hexamethyleneadipamide/caprolactam copolymer (PA-6/6,6). Among these aliphatic polyamides, preferred are PA-6 and PA-6,6. The number-average molecular weight of the polyamide (C1) is preferably from 10000 to 30000 and more preferably from 12500 to 25000.

Examples of the amorphous semi-aromatic polyamide (polyamide (C2)) include poly(hexamethyleneisophthalamide) (PA-6I), hexamethylenisophthalamide/hexamethylenephthalamide copolymer (PA-6I/6T), poly(m-xylyleneisophthalamide) (PA-MXDI), caprolactam/m-xylyleneisophthalamide copolymer (PA-6/MXDI) and caprolactam/hexamethyleneisophthalamide copolymer (PA-6/6I). Among these amorphous semi-aromatic polyamides, especially preferred is PA-6I/6T. The number-average molecular weight of the polyamide (C2) is preferably from 5000 to 40000 and more preferably from 10000 to 30000.

The polyamides (C1) and the polyamides (C2) are respectively used singly or in combination of any two or more thereof. When adding the polyamide (C1) only to the polyamide (B), the resultant polyamide mixture tends to occasionally exhibit a high crystallization rate depending upon kind and amount of the polyamide (C1) added, resulting in occurrence of inconveniences upon molding of the bottle. On the contrary, when adding the polyamide (C2) only to the polyamide (B), the resultant polyamide mixture tends to occasionally exhibit a low crystallization rate depending upon kind and amount of the polyamide (C1) added, resulting in occurrence of inconveniences upon molding of the bottle. Therefore, in some cases, the polyamide (C1) and the polyamide (C2) are preferably used in combination as the polyamide (C).

The water absorption rate of the polyamide (C) (polyamide (C1) and the polyamide (C2)) is preferably higher than that of the polyamide (B). In the present invention, the water absorption rate is measured at 23° C. and 50% RH under 1 atm by the following method.

(1) Pellets of the polyamide previously dried are preserved at 23° C. and 50% RH under 1 atm over 24 h.

(2) The water content in the pellets before and after the preservation is measured by a Carl-Fischer method at 235° C. for 30 min. The difference between the water contents in the pellets as measured before and after being preserved for absorbing water therein is divided by $(T)^{1/2}$ (T: preservation time=24 h), and the thus calculated value is determined as the water absorption rate of the polyamide.

Meanwhile, the reason for dividing the difference between the water contents by $(T)^{1/2}$ is that since the water absorption rate immediately after initiating absorption of water is gradually reduced and changed every moment, the water absorption rate needs to be averaged in order to avoid adverse influence thereby. However, the value obtained by dividing the difference between the water contents by not $(T)^{1/2}$ but T has substantially the same meaning as the above value although both the values are different from each other.

The water absorption rate of the polyamide (B) as measured at 23° C. and 50% RH under 1 atm is preferably from 100 to 500 $ppm/h^{-1}$ and more preferably from 150 to 400 $ppm/h^{-1}$.

Whereas, the water absorption rate of the polyamide (C) as measured at 23° C. and 50% RH under 1 atm is preferably from 250 to 1500 $ppm/h^{-1}$, more preferably from 300 to 1300 $ppm/h^{-1}$ and still more preferably from 500 to 1200 $ppm/h^{-1}$. When the water absorption rate of the polyamide (C) lies within the above-specified range, water rapidly absorbed in the polyamide (C) after blow molding of the bottle is immediately supplied to the polyamide (B), so that the polyamide (B) becomes soft. As a result, the barrier layer exhibits a good followability to the outermost and innermost layers when impact is applied to the bottle, resulting in excellent delamination resistance of the multilayer bottle.

The method of blending the polyamide (B) with the polyamide (C) is not particularly limited. The polyamide (B) and the polyamide (C) may be dry-blended with each other upon production of a preform of the bottle. Alternatively, the polyamide (B) and the polyamide (C) may be melt-blended with each other using a single-screw extruder, a twin-screw extruder, etc., prior to production of a preform of the bottle, or may be melt-blended with each other to prepare a master batch composed of these resins. However, since production of a simply melt-blended mixture is costly owing to need of difficult compounding procedure, the dry blending method or the melt-blending method for preparing the master batch is preferably used in order to provide the blended mixture of these polyamides in an inexpensive manner.

In the present invention, the content of the polyamide (C) in the barrier layer is 20% by weight or less, preferably from 1 to 20% by weight, more preferably from 1.5 to 15% by weight and still more preferably from 2 to 10% by weight on the basis of the weight of the barrier layer. When the content of the polyamide (C) in the barrier layer lies within the above-specified range, a moldability of the resin material upon forming a multilayer bottle is enhanced, and the resultant multilayer bottle exhibits an excellent delamination resistance and a good gas-barrier property.

The barrier layer is preferably made mainly of the polyamide (B). From the viewpoint of a good barrier property, the content of the polyamide (B) in the barrier layer is preferably 70% by weight or more, more preferably 80% by weight or more, and still more preferably 90% by weight or more (upper limit: 99% by weight, respectively). Depending upon kinds of resins or the like to be added to the polyamide (B), if the content of the resins or the like in the barrier layer is more than 30% by weight, the above OTR of the barrier layer tends to exceed 0.15 $cc·mm/(m^2·day·atm)$, resulting in deteriorated barrier property thereof.

When the aliphatic polyamide (polyamide (C1)) and the amorphous semi-aromatic polyamide (polyamide (C2)) are used in combination thereof, the polyamide (C2) is preferably used in an amount of from 0.25 to 4 parts by weight, more preferably from 0.35 to 2.9 parts by weight and still more preferably from 0.45 to 2.2 parts by weight per 1 part by weight of the polyamide (C1). When the amounts of these polyamides used lie within the above-specified range, molding of the bottle is carried out in a facilitated manner, and the resultant bottle is improved in delamination resistance substantially without deterioration in barrier property thereof.

The barrier layer may also contain one or plural kinds of other resins such as polyesters, polyolefins and phenoxy resins unless the addition of these resins adversely affects the aimed effects of the present invention. In addition, the barrier layer may also contain various additives. Examples of the additives include inorganic fillers such as glass fibers and carbon fibers; plate-shaped inorganic fillers such as glass flakes, talc, kaolin, mica, montmorillonite and organized clay; impact modifiers such as various elastomers; nucleating agents; lubricants such as fatty amide-based compounds and fatty acid metal salt-based compounds; antioxidants such as copper compounds, organic or inorganic halogen-based compounds, hindered phenol-based compounds, hindered amine-based compounds, hydrazine-based compounds, sulfur-based compounds and phosphorus-based compounds; heat stabilizers; anti-coloring agents; ultraviolet absorbers such as benzotriazole-based compounds; mold release agents; plasticizers; colorants; flame retardants; oxygen capturing agents such as cobalt-containing compounds; and anti-gelling agents such as alkali compounds.

The multilayer bottle of the present invention might sometimes have portions having a low stretch ratio (from 1 to 2.5 times) depending upon a shape of the preform or bottle. The portions having such a low stretch ratio tends to be whitened when water is absorbed therein. The polyamide (B) blended with the polyamide (C) having a higher saturation water content than that of the polyamide (B) exhibits a promoted water absorption. Therefore, if required, an anti-whitening agent may be added to the barrier layer to prevent whitening of the barrier layer, thereby enabling production of a multilayer bottle having a good transparency.

The anti-whitening agent is made of an aliphatic acid metal salt having 18 to 50 carbon atoms and preferably 18 to 34 carbon atoms. The aliphatic acid metal salt having 18 or more carbon atoms is expected to show a good anti-whitening effect, whereas the aliphatic acid metal salt having 50 or less carbon atoms is uniformly dispersed in the barrier layer. The aliphatic acid may be branched or may have double bonds. Examples of the preferred aliphatic acids include linear saturated aliphatic acids such as stearic acid (C18), eicosanoic acid (C20), behenic acid (C22), montanoic acid (C28) and triacontanoic acid (C30). Examples of the metals capable of forming a salt with these aliphatic acids include, but are not limited to, sodium, potassium, lithium, calcium, barium, magnesium, strontium, aluminum and zinc. Of these metals, preferred are sodium, potassium, lithium, calcium, aluminum and zinc.

The aliphatic acid metal salts may be used singly or in combination of any two or more thereof. In the present invention, although the particle size of the aliphatic acid metal salts is not particularly limited, the aliphatic acid metal salts preferably have a particle size of 0.2 mm or smaller since such small particles are readily uniformly dispersed in the barrier layer.

The amount of the aliphatic acid metal salt added is preferably from 0.005 to 1.0 part by weight, more preferably from 0.05 to 0.5 part by weight and still more preferably from 0.12 to 0.5 part by weight on the basis of 100 parts by weight of a total amount of the barrier layer. When the amount of the aliphatic acid metal salt added to the barrier layer is 0.005 part by weight or more on the basis of 100 parts by weight of the total amount of the barrier layer, it is expected that the barrier layer exhibits a good anti-whitening effect. When the amount of the aliphatic acid metal salt added to the barrier layer is 1.0 part by weight or less on the basis of 100 parts by weight of the total amount of the barrier layer, the resultant multilayer bottle maintains a low haze.

Alternatively, a compound selected from the group consisting of the following diamide compounds and diester compounds may be added as the anti-whitening agent in place of the above aliphatic acid metal salt. The diamide compounds and the diester compounds may be respectively added singly or in the form of a mixture of any two or more thereof, or the one or more diamide compounds may be used in combination with the one or more diester compounds.

The diamide compounds may be produced by reacting an aliphatic acid having 8 to 30 carbon atoms with a diamine having 2 to 10 carbon atoms. The diamide compounds obtained from an aliphatic acid having 8 or more carbon atoms and a diamine having 2 or more carbon atoms are expected to show a good anti-whitening effect, whereas the diamide compounds obtained from an aliphatic acid having 30 or less carbon atoms and a diamine having 10 or less carbon atoms are uniformly dispersed in the barrier layer. The aliphatic acids may be branched or may have double bonds. Of these aliphatic acids, preferred are linear saturated aliphatic acids.

Examples of the aliphatic acid component of the diamide compounds include stearic acid (C18), eicosanoic acid (C20), behenic acid (C22), montanoic acid (C28) and triacontanoic acid (C30). Examples of the diamine component of the diamide compounds include ethylenediamine, butylenediamine, hexanediamine, xylylenediamine and bis(aminomethyl)cyclohexane. In the present invention, the diamide compounds produced from combination of these components may be suitably used. Of these diamide compounds, preferred are diamide compounds obtained from an aliphatic acid having 8 to 30 carbon atoms and a diamine composed mainly of ethylenediamine, and diamide compounds obtained from an aliphatic acid composed mainly of mantanoic acid and a diamine having 2 to 10 carbon atoms.

The diester compounds may be produced by reacting an aliphatic acid having 8 to 30 carbon atoms with a diol having 2 to 10 carbon atoms. The diester compounds obtained from an aliphatic acid having 8 or more carbon atoms and a diol having 2 or more carbon atoms are expected to show a good anti-whitening effect, whereas the diester compounds obtained from an aliphatic acid having 30 or less carbon atoms and a diol having 10 or less carbon atoms are uniformly dispersed in the barrier layer. The aliphatic acids may be branched or may have double bonds. Of these aliphatic acids, preferred are linear saturated aliphatic acids.

Examples of the aliphatic acid component of the diester compounds include stearic acid (C18), eicosanoic acid (C20), behenic acid (C22), montanoic acid (C28) and triacontanoic acid (C30). Examples of the diol component of the diester compounds include ethylene glycol, propanediol, butanediol, hexanediol, xylylene glycol and cyclohexane dimethanol. In the present invention, the diester compounds produced from combination of these components may be suitably used. Of these diester compounds, preferred are diester compounds obtained from an aliphatic acid composed mainly of montanoic acid and a diol composed mainly of ethylene glycol and/or 1,3-butanediol.

The amount of the diamide compound and/or the diester compound added is preferably from 0.005 to 1.0 part by weight, more preferably from 0.05 to 0.5 part by weight and still more preferably from 0.12 to 0.5 part by weight on the basis of 100 parts by weight of the total amount of the barrier layer. When the amount of the diamide compound and/or the diester compound added to the barrier layer is 0.005 part by weight or more on the basis of 100 parts by weight of the total amount of the barrier layer, it is expected that the barrier layer exhibits a good anti-whitening effect. When the amount of the diamide compound and/or the diester compound added to the barrier layer is 1.0 part by weight or less on the basis of 100 parts by weight of the total amount of the barrier layer, the resultant multilayer bottle maintains a low haze.

The anti-whitening agent may be added to the polyamides (barrier layer) by conventionally known mixing methods. For example, pellets of the polyamide resins and the anti-whitening agent may be charged into a rotary hollow container and mixed together therein. Alternatively, there may be adopted such a method in which after producing a polyamide resin composition containing a high concentration of the anti-whitening agent, the thus produced resin composition is diluted with pellets of the polyamide resins containing no anti-whitening agent to prepare a resin composition having a predetermined concentration of the anti-whitening agent, followed by melt-kneading the resultant diluted composition; or such a method in which after melt-kneading, the resultant resin composition is successively shaped by an injection-molding method, etc.

When using the anti-whitening agent, the barrier layer can be prevented from suffering from whitening immediately after production of the multilayer bottle. Further, even after being preserved for a long period of time under whitening-free or hardly-whitening conditions, the barrier layer can also be prevented from suffering from whitening. More specifically, even when the multilayer bottle that has been preserved for a long period of time under such conditions in which the bottle is free from whitening or hardly undergo whitening even without adding the anti-whitening agent thereto, e.g., at a temperature of 23° C. and a relative humidity of 50%, is exposed to a high humidity, contacted with water or boiled water or heated to a temperature higher than the glass transition temperature of the resins, the occurrence of whitening therein is inhibited similarly to immediately after molding.

In the present invention, an antistatic agent may be added in an amount of from 1 to 1000 ppm to the blended mixture of the polyamide (B) and the polyamide (C). The polyamide (B) and the polyamide (C) when dry-blended together tend to be separated or divided (classified) from each other by static electricity generated depending on environmental conditions upon use owing to difference between dielectric constants thereof. As a result, the obtained molded product tends to suffer from change in blending ratio of the components between portions thereof, thereby failing to obtain a molded bottle having desired properties. Thus, when optionally adding the antistatic agent to the barrier layer, the polyamide (B)

and the polyamide (C) are uniformly blended with each other, thereby enabling production of a multilayer bottle having good properties.

In the present invention, there may be used known antistatic agents such as nonionic surfactants, anionic surfactants and cationic surfactants. Examples of the nonionic surfactants include polyethylene glycol-based surfactants of an ester type, an ether type or an alkyl phenol type, polyhydric alcohol partial ester-based surfactants of a sorbitan ester type, and ester ether-based surfactants of a polyoxyethylene sorbitan ester type, although not particularly limited thereto. In the present invention, among these surfactants, polyoxyethylene sorbitan monolaurate as one of the ester ether-based surfactants of a polyoxyethylene sorbitan ester type is preferably used because of excellent antistatic effect thereof on the polyamide (B) and the polyamide (C).

The antistatic agents may be used alone or in combination of any two or more thereof. The amount of the antistatic agent added is preferably from 1 to 1000 ppm, more preferably from 10 to 500 ppm and still more preferably from 20 to 100 ppm on the basis of the total amount of the barrier layer. When the amount of the antistatic agent added lies within the above-specified range, the polyamide (B) and the polyamide (C) are uniformly blended with each other, thereby enabling production of a bottle having a stable quality.

The multilayer bottle of the present invention may be produced by the following procedure. That is, using an injection molding machine equipped with two injection cylinders, the polyester (A) and a blended mixture of the polyamide (B) and the polyamide (C) are injected from the skin-side injection cylinder and the core-side injection cylinder, respectively, into a metal mold cavity through respective metal mold hot runners to produce a multilayer preform, and then the obtained multilayer preform is subjected to biaxial stretch blow molding by conventionally known methods to obtain the multilayer bottle.

In general, the multilayer preform may be blow-molded by conventionally known methods such as a so-called cold parison method and a so-called hot parison method. For example, there may be used the method in which after heating a surface of the multilayer preform to a temperature of 80 to 120° C., the multilayer preform is stretched in an axial direction thereof by a mechanical means such as a core rod insertion, and then a high-pressure air usually pressurized to from 2 to 4 MPa is blown into the multilayer preform to subject the preform to stretching and blow molding in a lateral direction thereof, or the method in which after crystallizing a mouth portion of the multilayer preform and heating a surface of the multilayer preform to a temperature of 80 to 120° C., the multilayer preform is subjected to blow molding in a metal mold heated to a temperature of 90 to 150° C.

In the present invention, the heating temperature of the preform is preferably from 90 to 110° C. and more preferably from 95 to 108° C. When the heating temperature of the preform is lower than 90° C., the barrier layer or the polyester (A) layer tends to undergo cold stretching and whitening owing to insufficient heating. When the heating temperature of the preform is higher than 110° C., the barrier layer tends to suffer from crystallization and whitening, and further the resultant multilayer bottle tends to be deteriorated in delamination resistance.

From the viewpoints of excellent barrier property and moldability, the multilayer bottle of the present invention preferably has a three-layer structure constructed successively from a polyester (A) layer, a barrier layer and a polyester (A) layer, or a five-layer structure constructed successively from a polyester (A) layer, a barrier layer, a polyester (A) layer, a barrier layer and a polyester (A) layer.

The multilayer bottle having a three-layer structure or a five-layer structure may be produced by subjecting a multilayer preform having a corresponding three-layer structure or a corresponding five-layer structure to biaxial stretch blow molding by conventionally known methods. The method of producing the multilayer preform having a three-layer structure or a five-layer structure is not particularly limited, and there may be used any suitable conventionally known methods. For example, the polyester (A) forming the innermost and outermost layers of the multilayer preform is first injected from the skin-side injection cylinder of the injection molding machine. Then, the resin material forming the barrier layer and the polyester (A) are injected at the same time from the core-side injection cylinder and the skin-side injection cylinder, respectively, and further a necessary amount of the polyester (A) is injected from the skin-side injection cylinder to fill a cavity of the metal mold, thereby producing the multilayer preform having a three-layer structure constructed successively from a polyester (A) layer, a barrier layer and a polyester (A) layer.

Also, the polyester (A) is first injected from the skin-side injection cylinder of the injection molding machine, and then the resin material forming the barrier layer solely is injected from the core-side injection cylinder, and finally the polyester (A) is injected from the skin-side injection cylinder to fill the cavity of the metal mold, thereby producing the multilayer preform having a five-layer structure constructed successively from a polyester (A) layer, a barrier layer, a polyester (A) layer, a barrier layer and a polyester (A) layer.

Meanwhile, the method for production of the multilayer preform is not limited only to the above methods.

The thickness of the polyester (A) layer in the multilayer bottle is preferably from 0.01 to 1 mm, and the thickness of the barrier layer therein is preferably from 0.005 to 0.2 mm (from 5 to 200 µm). The thickness of the multilayer bottle is not necessarily constant over an entire part thereof, and is usually in the range of from 0.2 to 1.0 mm.

In the multilayer bottle obtained by subjecting the multilayer preform to biaxial stretch blow molding, the barrier layer may be provided at least in a barrel portion of the multilayer bottle in order to allow the bottle to exhibit a good gas-barrier property. However, when the barrier layer extends up to near a tip end of a mouth portion of the bottle, the gas-barrier property of the multilayer bottle can be further enhanced.

The weight percentage of the barrier layer in the multilayer bottle of the present invention is preferably from 1 to 20% by weight, more preferably from 2 to 15% by weight and still more preferably from 3 to 10% by weight on the basis of a total weight of the multilayer bottle. When the weight percentage of the barrier layer lies within the above-specified range, the resultant multilayer bottle exhibits a good gas-barrier property, and the multilayer preform as a precursor is readily molded into the multilayer bottle.

In the present invention, the multilayer preform is especially preferably produced by supplying a dry-blended mixture of the polyamide (B) and the polyamide (C) to a molding machine. By supplying such a dry-blended mixture, increase in costs required for preparing a melt blend can be avoided, thereby producing a bottle in an inexpensive manner. Also, the polyamide (B) and the polyamide (C) in the melt blend tend to be deteriorated in quality owing to excessive heat history applied thereto depending upon the conditions used, resulting in difficult production of the preform under constant stable conditions or yellow discoloration of the polyamides.

When dry-blending the polyamide (B) with the polyamide (C), an antistatic agent is also preferably added thereto.

Also, a phosphorus compound is preferably added to the polyamide (B) and/or the polyamide (C) in order to enhance a processing stability upon melt-molding or prevent undesired coloration of the polyamides. Examples of the phosphorus compound include phosphorus compounds containing alkali metals or alkali earth metals. Specific examples of the phosphorus compound suitably used in the present invention include phosphates, hypophosphites and phosphites of alkali metals or alkali earth metals such as sodium, magnesium and calcium. Among these phosphorus compounds, hypophosphites of alkali metals or alkali earth metals are preferred because they have an especially excellent effect of preventing undesired coloration. The concentration of the phosphorus compound in the polyamide (B) and/or the polyamide (C) is preferably from 1 to 500 ppm, more preferably 350 ppm or less and still more preferably 200 ppm or less in terms of phosphorus atom. Even when the concentration of phosphorus atom added exceeds 500 ppm, the effect of preventing coloration is no longer improved, and rather the resultant film tends to suffer from increase in haze.

The multilayer bottle of the present invention is prevented from causing delamination even upon dropping or upon exposure to impact. Also, unlike the conventional multilayer bottles, the multilayer bottle of the present invention is improved in delamination resistance without the sacrifice of a barrier property thereof. In addition, the multilayer bottle has a large freedom of design without limitations to specific shapes with less irregularities or less bends owing to less occurrence of delamination even when the bottle is of such a shape having irregularities or bends. The multilayer bottle of the present invention is suitably used to store and preserve various products therein. Examples of the products stored or preserved in the multilayer bottle include liquid beverages such as carbonated beverage, juice, water, milk, sake, whisky, shochu, coffee, tea, jelly beverage and healthy beverage, seasonings such as liquid seasoning, sauce, soy sauce, dressing and liquid soup stock, liquid processed foodstuffs such as liquid soup, liquid drugs, cosmetics such as beauty wash, milky lotion and hair dressing, hair care products such as hair dye and shampoo, etc.

EXAMPLES

The present invention will be described in more detail below with reference to the following examples and comparative examples. However, these examples are only illustrative and not intended to limit the invention thereto. Meanwhile, various properties of the multilayer bottle were evaluated by the following methods.

(1) Height of Delamination

The delamination resistance of the multilayer container was evaluated by a height of delamination as measured by subjecting the container to drop test according to ASTM D2463-95 Procedure B. The larger height of delamination indicates a higher delamination resistance. Specifically, first, the multilayer container to be tested was filled with water and capped, and then dropped to visually observe occurrence of any delamination therein. At this time, the multilayer container is vertically dropped such that a bottom portion of the multilayer container was impinged against a floor. The drop test was repeated while the drop height of the multilayer container was increased and decreased at intervals of 15 cm. The number of the multilayer container subjected to the drop test was 30.

(2) Oxygen Permeability/Oxygen Transmission Rate

The oxygen permeability of the multilayer bottle was measured at 23° C. and a relative humidity of 100% RH for an inside of the bottle and 50% RH for an outside of the bottle according to ASTM D3985. The measurement of the oxygen permeability was conducted using a measuring apparatus "OX-TRAN 2/61" available from Modern Controls Corp. The lower oxygen permeability indicates a higher oxygen barrier property of the bottle. Meanwhile, upon measuring an oxygen transmission rate (OTR) of the barrier layer of the bottle, the bottle was carefully delaminated to separate and sample the barrier layer solely therefrom, and the OTR of the thus obtained barrier layer was measured at 60% RH and 23° C. The measurement of the OTR was conducted using a measuring apparatus "OX-TRAN 2/61" available from Modern Controls Corp.

(3) Carbon Dioxide Barrier Property ($CO_2$ Loss)

Into a bottle (capacity: 500 mL) was filled a carbonated water containing carbon dioxide in an amount of 4 G.V. (gas volume: four times the capacity of the bottle; normal condition). The bottle thus filled was preserved at 23° C. and 50% RH to continuously measure the change in inside pressure of the bottle with time. Since the carbon dioxide inside of the bottle is penetrated through a wall of the bottle with the passage of time, the inside pressure of the bottle is decreased with time. The carbon dioxide barrier property of the bottle was evaluated from the number of days as a shelf life thereof which elapsed until an initial inside pressure value as 100% was reduced to 90%. The larger number of elapsed days indicates a higher carbon dioxide barrier property of the bottle.

(4) Saturation Water Content

A stretched polyamide film (stretched 10 times in area ratio) was preserved at 23° C. and 50% RH under 1 atm over 4 weeks, and the water content of the film after the preservation was measured by a Carl-Fischer method using "AQ-2000" available from Hiranuma Sangyo Co., Ltd. The thus measured value was determined as a saturation water content of the polyamide. The measuring temperature was 235° C., and the measuring time was 30 min. In addition, the bottle was carefully delaminated to separate and sample the barrier layer therefrom, and the saturation water content of the barrier layer was measured by the same method as described above.

Example 1

Under the following conditions, the raw resin materials were injection-molded to form a three-layer preform (27 g) constructed successively from a polyester (A) layer, a barrier layer and a polyester (A) layer. After cooling, the resultant preform was heated and subjected to biaxial stretch blow molding, thereby obtaining a multilayer bottle.

Polyester (A) Layer

Polyethylene terephthalate "RT543C" available from Nippon Unipet Co., Ltd.

Intrinsic viscosity: 0.75 as measured at 30° C. in a mixed solvent containing phenol and tetrachloroethane at a weight ratio of 6/4.

Barrier Layer

Polyamide (B): Poly-m-xylyleneadipamide "MX Nylon 56007" available from Mitsubishi Gas Chemical Co., Inc. 95% by weight Polyamide (C): Nylon 6 "1015B" available from Ube Kosan Co., Ltd. 5% by weight Upon mixing the resins, 50 ppm of polyoxyethylene sorbitan monolaurate "NONION LT-221" available from Nippon Oils & Fats Co., Ltd., as an antistatic agent was added thereto, and the resultant mixture was dry-blended for 30 min using a tumbler. Upon molding the obtained pellets for producing a preform, neither sticking and adhesion of the pellets onto a wall surface of a hopper nor division (classification) of the pellets owing to static electricity generated thereon, occurred, and the resultant preform had a stable quality. The weight percentage of the barrier layer was 5% by weight on the basis of a total weight of the resultant multilayer bottle. The results of evaluation of the multilayer bottle are shown in Table 1.

Shape of Three-Layer Preform
  Whole length: 95 mm; outer diameter: 22 mm; wall thickness: 4.2 mm
  The three-layer preform was produced using an injection molding machine (Model: "M200"; four-shot molding type) available from Meiki Seisakusho Co., Ltd.

Molding Conditions for Three-Layer Preform
  Skin-side injection cylinder temperature: 280° C.
  Core-side injection cylinder temperature: 250° C.
  Mold runner temperature: 280° C.
  Mold cooling water temperature: 15° C.
  Proportion of barrier resin in preform: 5% by weight Shape of Multilayer Bottle
  Whole length: 223 mm; outer diameter: 65 mm; capacity: 500 mL;
  bottom shape: champagne shape; no dimples in a barrel portion.
  The biaxial stretch blow molding was performed by using a blow molding machine (Model: "EFB100ET") available from Frontier Inc.

Conditions of Biaxial Stretch Blow Molding
  Heating temperature of preform: 103° C.
  Pressure applied to stretching rod: 0.5 MPa
  Primary blow pressure: 1.0 MPa
  Secondary blow pressure: 2.5 MPa
  Primary blow retardation time: 0.35 s
  Primary blow time: 0.28 s
  Secondary blow time: 2.0 s
  Blow evacuation time: 0.6 s
  Mold temperature: 30° C.

Examples 2 to 5 and Comparative Examples 1 to 3

The same procedure as in Example 1 was repeated except that the composition of the barrier layer was changed to those shown in Table 1, thereby obtaining multilayer bottles. The results of evaluation of the thus obtained multilayer bottles are shown in Table 1.

The meanings of abbreviations of polyamides shown in Table 1 are as follows.

(1) S6007: Poly-m-xylyleneadipamide "MX Nylon S6007" (solid-state polymerization product) available from Mitsubishi Gas Chemical Co., Inc.
  Number-average molecular weight: 23500
  Relative viscosity: 2.70 (as measured at 25° C. in a solution prepared by dissolving 1 g of the resin in 100 mL of 96% sulfuric acid; this is similarly applied the following descriptions.)
  Saturation water content: 3.4% by weight
  Water absorption rate: 280 ppm/$h^{1/2}$ (2) S6121: Poly-m-xylyleneadipamide "MX Nylon S6121" (solid-state polymerization product) available from Mitsubishi Gas Chemical Co., Inc.
  Number-average molecular weight: 40000
  Relative viscosity: 3.94
  Saturation water content: 3.4% by weight
  Water absorption rate: 270 ppm/$h^{1/2}$ (3) 1015B: Nylon 6 "Grade: 1015B" available from Ube Kosan Co., Ltd.
  Number-average molecular weight: 15000
  Saturation water content: 7.1% by weight
  Water absorption rate: 1090 ppm/$h^{1/2}$ (4) 1020B: Nylon 6 "Grade: 1020B" available from Ube Kosan Co., Ltd.
  Number-average molecular weight: 20000
  Saturation water content: 7.1% by weight
  Water absorption rate: 1070 ppm/$h^{1/2}$ (5) 2020B: Nylon 66 "Grade: 2020B" available from Ube Kosan Co., Ltd.
  Number-average molecular weight: 20000
  Saturation water content: 6.3% by weight
  Water absorption rate: 1000 ppm/$h^{1/2}$ (6) X21F07: Nylon 6I/6T "Grade: NOVAMIDE X21F07" available from Mitsubishi Engineering Plastics Co., Ltd.
  Saturation water content: 11% by weight
  Water absorption rate: 910 ppm/$h^{1/2}$ (7) 3024: Nylon 12 "Grade: 3024NUX" available from Ube Kosan Co., Ltd.
  Saturation water content: 1.2% by weight
  Water absorption rate: 100 ppm/$h^{1/2}$ As shown in the above Examples and Comparative Examples, the bottles obtained according to the present invention in which the barrier layer was composed of the different kinds of polyamides capable of satisfying the specific saturation water contents, exhibited both a very excellent delamination resistance and a good gas-barrier property, whereas the bottles incapable of satisfying the requirements of the present invention were deteriorated in delamination resistance or gas-barrier property.

TABLE 1-1

|  | Examples | | | | |
| --- | --- | --- | --- | --- | --- |
|  | 1 | 2 | 3 | 4 | 5 |
| Polyamide (B) | S6007 | S6007 | S6007 | S6007 | S6121 |
| Proportion of barrier layer (wt %) | 95 | 85 | 90 | 90 | 90 |
| Polyamide (C) | | | | | |
| Aliphatic polyamide | 1015B | — | 1015B | 1020B | 2020B |
| Proportion of barrier layer (wt %) | 5 | — | 6.7 | 5 | 4 |
| Amorphous semi-aromatic polyamide | — | X21F07 | X21F07 | X21F07 | X21F07 |
| Proportion of barrier layer (wt %) | — | 15 | 3.3 | 5 | 6 |
| Height of delamination (cm) | 250 | 270 | 319 | 308 | 310 |
| OTR of barrier layer [cc · mm/(m$^2$ · day · atm)] | 0.06 | 0.08 | 0.07 | 0.07 | 0.06 |
| Oxygen permeability of bottle (cc/bottle · day · 0.21 atm) | 0.011 | 0.013 | 0.012 | 0.012 | 0.011 |

TABLE 1-1-continued

| | Examples | | | | |
|---|---|---|---|---|---|
| | 1 | 2 | 3 | 4 | 5 |
| $CO_2$ Loss (day) | 120 | 105 | 115 | 112 | 119 |
| Saturation water content of barrier layer (wt %) | 3.6 | 4.5 | 3.8 | 4.0 | 4.0 |

TABLE 1-2

| | Comparative Examples | | |
|---|---|---|---|
| | 1 | 2 | 3 |
| Polyamide (B) | S6007 | S6007 | S6007 |
| Proportion of barrier layer (wt %) | 100 | 50 | 80 |
| Polyamide (C) | | | |
| Aliphatic polyamide | — | 1015B | 3024 |
| Proportion of barrier layer (wt %) | — | 40 | 20 |
| Amorphous semi-aromatic polyamide | — | X21F07 | — |
| Proportion of barrier layer (wt %) | — | 10 | — |
| Height of delamination (cm) | 150 | 302 | 180 |
| OTR of barrier layer [cc · mm/(m² · day · atm)] | 0.06 | 0.19 | 0.16 |
| Oxygen permeability of bottle (cc/bottle · day · 0.21 atm) | 0.011 | 0.02 | 0.019 |
| $CO_2$ Loss (day) | 120 | 63 | 70 |
| Saturation water content of barrier layer (wt %) | 3.4 | 5.6 | 3.0 |

INDUSTRIAL APPLICABILITY

In accordance with the present invention, the multilayer bottle having a high freedom of container shape and an excellent gas barrier property is produced with low costs since the bottle is substantially free from delamination. Thus, the present invention is largely valuable from industrial viewpoints.

The invention claimed is:

1. A multilayer bottle comprising outermost and innermost layers each made mainly of a polyester (A) and at least one barrier layer interposed between the outermost and innermost layers, wherein the polyester (A) is a thermoplastic resin obtained by polymerizing a dicarboxylic acid component containing 80 mol % or more of terephthalic acid with a diol component containing 80 mol % or more of ethylene glycol; and the barrier layer comprises a polyamide (B) obtained by polycondensing a diamine component containing 70 mol % or more of m-xylylenediamine with a dicarboxylic acid component containing 70 mol % or more of adipic acid, and a polyamide (C) having a higher saturation water content than that of the polyamide (B) as measured at 23° C. and 50% RH under 1 atm, a content of the polyamide (C) in the barrier layer being 20% by weight or less on the basis of a weight of the barrier layer, wherein the polyamide (C) is a combination of aliphatic polyamide and amorphous semi-aromatic polyamide, and wherein the amorphous semi-aromatic polyamide is contained in an amount of from 0.35 to 2.9 parts by weight per 1 part by weight of the aliphatic polyamide, and wherein a content of the polyamide (B) in the barrier layer is 80% by weight or more on the basis of a weight of the barrier layer.

2. The multilayer bottle according to claim 1, wherein the saturation water content of the polyamide (B) is from 2.5 to 5% by weight.

3. The multilayer bottle according to claim 1, wherein the saturation water content of the polyamide (C) is from 3 to 13% by weight.

4. The multilayer bottle according to claim 1, wherein a content of the polyamide (C) in the barrier layer is from 1 to 20% by weight on the basis of a weight of the barrier layer.

5. The multilayer bottle according to claim 1, wherein the aliphatic polyamide is poly(6-aminohexanoic acid) and/or poly(hexamethyleneadipamide), and the amorphous semi-aromatic polyamide is a hexamethyleneisophthalamide/hexamethyleneterephthalamide copolymer.

6. The multilayer bottle according to claim 1, wherein the barrier layer contains an aliphatic acid metal salt having 18 to 50 carbon atoms in an amount of from 0.005 to 1.0 part by weight on the basis of 100 parts by weight of a total amount of the barrier layer.

7. The multilayer bottle according to claim 1, wherein the barrier layer contains an antistatic agent in an amount of from 1 to 1000 ppm.

8. The multilayer bottle according to claim 1, wherein the polyamide (B) has a number-average molecular weight of from 18000 to 43500.

9. The multilayer bottle according to claim 1, wherein the multilayer bottle has a three-layer structure successively comprising a layer of the polyester (A), the barrier layer and a layer of the polyester (A).

10. The multilayer bottle according to claim 1, wherein the multilayer bottle has a five-layer structure successively comprising a layer of the polyester (A), the barrier layer, a layer of the polyester (A), the barrier layer and a layer of the polyester (A).

11. The multilayer bottle according to claim 1, wherein a weight percentage of the barrier layer is from 1 to 20% by weight on the basis of a total weight of the multilayer bottle.

12. The multilayer bottle according to claim 1, wherein the barrier layer is a layer obtained from a dry-blended mixture of the polyamide (B) and the polyamide (C).

13. The multilayer bottle according to claim 1, wherein the amorphous semi-aromatic polyamide is contained in an amount of 1.5 to 2.2 parts by weight per 1 part by weight of the aliphatic polyamide.

14. The multilayer bottle according to claim 1, wherein a thickness of the barrier layer is 0.005 mm to 0.2 mm, and a thickness of each layer of polyester is 0.01 mm to 1 mm.

15. The multilayer bottle according to claim 1, wherein the aliphatic polyamide is poly (6-aminohexanoic acid) or poly (hexamethyleneadipamide).

16. The multilayer bottle according to claim 1, wherein said barrier layer has an oxygen transmission rate (OTR) as measured at a temperature of 23° C. and a relative humidity of 60% of 0.15 cc·mm/(m²·day·atm) or less.

17. The multilayer bottle according to claim 16, wherein said OTR of said barrier layer is 0.08 cc·mm/(m²·day·atm) or less.

18. The multilayer bottle according to claim 1, wherein the amorphous semi-aromatic polyamide is contained in an amount of from 0.45 to 2.2 parts by weight per one part by weight of the aliphatic polyamide.

19. The multilayer bottle according to claim 1, wherein the barrier layer includes 90% to 99% by weight of said polyamide (B).

20. The multilayer bottle according to claim 1, wherein the polyamide (B) is poly-m-xylyleneadipamide.

* * * * *